US008157905B2

(12) United States Patent
Lewis et al.

(10) Patent No.: US 8,157,905 B2
(45) Date of Patent: Apr. 17, 2012

(54) SECURITY INKS CONTAINING INFRARED ABSORBING METAL COMPOUNDS

(75) Inventors: David Malcolm Lewis, Otley (GB); Peter Jeffrey Broadbent, Knaresborough (GB)

(73) Assignee: Inovink Limited, Sheffield (GB)

( * ) Notice: Subject to any disclaimer, the term of this patent is extended or adjusted under 35 U.S.C. 154(b) by 655 days.

(21) Appl. No.: 12/226,417

(22) PCT Filed: May 11, 2007

(86) PCT No.: PCT/GB2007/001753
§ 371 (c)(1),
(2), (4) Date: Oct. 17, 2008

(87) PCT Pub. No.: WO2007/132214
PCT Pub. Date: Nov. 22, 2007

(65) Prior Publication Data
US 2010/0059691 A1 Mar. 11, 2010

(30) Foreign Application Priority Data
May 13, 2006 (GB) .................................. 06095553.3

(51) Int. Cl.
*C09D 11/02* (2006.01)
(52) U.S. Cl. .................. 106/31.64; 106/31.32
(58) Field of Classification Search ............... 106/31.32, 106/31.64
See application file for complete search history.

(56) References Cited

U.S. PATENT DOCUMENTS
| | | | |
|---|---|---|---|
| 5,118,349 A | 6/1992 | Jalon | |
| 2003/0177941 A1 | 9/2003 | Barbera-Guillem | |
| 2005/0279248 A1 | 12/2005 | Auslander | |

FOREIGN PATENT DOCUMENTS
| | | |
|---|---|---|
| EP | 1 661 648 A1 | 5/2006 |
| GB | 1 233 001 | 5/1971 |
| GB | 2 412 350 A | 9/2005 |
| JP | 2002-179947 | 6/2002 |
| JP | 2005-246821 | 9/2005 |
| JP | 2005-248050 | 9/2005 |
| WO | WO 2005/068207 A1 | 7/2005 |

OTHER PUBLICATIONS

International Preliminary Report on Patentability; International Application No. PCT/GB2007/001753; International Filing Date May 11, 2007 (7 pgs).

*Primary Examiner* — Jerry Lorengo
*Assistant Examiner* — Veronica F Faison
(74) *Attorney, Agent, or Firm* — Nixon & Vanderhye

(57) ABSTRACT

Composition including an oleophilic base ink composition having dispersed therein particles of an infrared-absorbing material wherein the infrared-absorbing material is selected from reduced indium tin oxide, titanium nitride, zirconium nitride, molybdenum metal, copper chromate, lanthanum hexaboride, neodymium oxide, neodymium chloride, dysprosium oxide and praseodymium oxide.

8 Claims, 10 Drawing Sheets

2% Reduced indium tin oxide (nanoparticle) (12 μm wet film thickness)

SECURITY INKS CONTAINING INFRARED ABSORBING METAL COMPOUNDS

This application is the U.S. National Phase of International Application PCT/GB2007/001753, filed 11 May 2007, which designated the U.S. PCT/GB2007/001753 claims priority to British Application No. 0609553.3, filed 13 May 2006. The entire content of these applications are incorporated herein by reference.

The present invention relates to compositions useful in security applications, to articles imaged with such compositions to provide a security image and to methods of manufacturing and using said articles.

BACKGROUND OF THE INVENTION

Articles comprising security images are well known. Security images generally comprise an image which is invisible or otherwise undetectable under ambient conditions, and which can be rendered visible or detectable by application of a suitable stimulus; or alternatively, the image may change from one colour under ambient conditions to another colour upon application of a stimulus. The stimulus may, for example, be electromagnetic radiation or heat.

Security images may be produced by coating security inks or compounds onto a substrate. Examples of known compounds which when coated onto a substrate provide a security image include photochromic compounds which generally change from colourless to coloured upon the application of ultraviolet light, and thermochromic compounds which generally change from colourless to coloured upon the application of heat.

Articles which include security images are useful in many areas of industry, for example in packaging, identification cards, and labels. Such articles may comprise a further printed image, in addition to the security image. It is useful to provide packaging which includes a security image invisible to a user under ambient conditions, but which can be rendered visible upon application of a stimulus; for example, if a customs and excise official wishes to check whether imported goods are genuine or counterfeit. If the packaging includes the security image, rendered visible or otherwise detectable by a suitable stimulus, the customs and excise official can determine that the packaging, and hence the goods, are not counterfeit. Likewise, it is advantageous to provide an identification card in which a security image is invisible or a defined colour under ambient conditions, but which can be rendered visible or detectable, or change colour upon application of a stimulus in order to prove the identity of a user of the identity card, in order to determine that the identity card is genuine. There are many known examples of such security images, for example, in the applicant's co-pending applications PCT/GB2005/001763 and PCT/GB2005/001766.

In the manufacture of bank notes, it is desirable to include as many security features as possible, which may include multiple security images using a variety of compounds capable of changing colour upon application of a stimulus or stimuli (including movement of the bank note to change viewing angle), or turning coloured from colourless, or vice versa.

In many countries, officials and state authorities use apparatus, such as third party verifiers, which detect the percentage radiation absorbance and/or reflectance at a wavelength of approximately 800-900 nm (in the infrared region), to detect whether specific security images comprising compounds which absorb infrared radiation between 800-900 nm are present; and hence help to determine whether or not a bank note is genuine or counterfeit.

It is desirable to provide bank notes which contain security images comprising compounds capable of exhibiting 50% or less radiation reflectance at approximately 800-900 nm. Many bank notes include carbon black as a pigment which possesses the characteristic of less than 50% light reflectance at 800-900 nm. Unfortunately, in order to provide a suitably strong image, with the required radiation reflectance characteristics at 800-900 nm, carbon black is generally needed in a concentration which produces a dull grey image in the positions where the carbon black are located, when coated at concentrations generally used (for example, 3% w/w of the total weight of the ink dispersion laid down on the substrate paper for bank notes). Bank note counterfeiters recognise from the dull grey image that carbon black is present in bank notes, and commonly now use carbon black in order to prevent their counterfeit bank notes being detected as counterfeit when third party verifiers are used to verify the radiation reflectance at 800-900 nm.

It would therefore be advantageous to provide a security image on a bank note or any other article requiring a security image, in which the security image includes one or more compounds having, a 50% or less radiation reflectance at 800-900 nm at a given concentration within an image (for example around 850 nm), and in which a strongly coloured image is not created by the compound(s) utilised. It would be particularly advantageous to provide such a compound for inclusion in a security image in which the compound produces a substantially colourless security image, but which has 50% or less radiation reflectance at 800-900 nm. Most preferably 40% radiation reflectance in the 800-900 nm region is desired.

Further, it would be advantageous to provide a security image on a banknote or other imaged article requiring a security image which could be detected at wavelengths other than 800 to 900 nm, for example over the range 700 to 1500 nm. This would enable an additional security feature to be introduced which is currently not known to counterfeiters. Radiation absorbed or reflected at wavelengths of 750 to 1500 nm falls within the infrared radiation region of the electromagnetic spectrum.

Infrared-absorbing compounds currently used in security imaging include various complex organic compounds, in addition to carbon black. Some of these organic compounds do not create a strongly coloured image; for example see the applicant's co-pending application GB 0602821.1. However such compounds have other disadvantages.

Many known organic infrared-absorbing compounds are complex molecules: their synthesis is often difficult and can be very expensive. Due to the time taken to prepare the compounds, supply problems may result. In addition, such compounds have been found to exhibit poor light fastness. Over time, exposure to daylight leads to decomposition and the usefulness of such compounds as infrared absorbers diminishes.

SUMMARY OF THE INVENTION

It is an object of the present invention to overcome at least one disadvantage associated with the prior art.

According to a first aspect of the present invention, there is provided a composition comprising an ink and an infrared-absorbing material wherein said infrared-absorbing material comprises a metal, a metal salt, a metal oxide or a metal nitride.

Complex organometallic species in which an organic molecule forms a coordinate complex with a metal centre are outside the scope of the present invention. However the infrared-absorbing material may comprise a metal salt which is a salt of a simple organic compound, for example a simple organic acid. Thus acetates, formates and benzoates are, for example, within the scope of the invention. Also within the scope of the invention are simple organosulfates, organosulfonates, organophosphates and organophosphononate salts, for example p-toluene sulfonic acid, benzene phosphonic acid, dodecylbenzene sulfate and dodecylphosphate.

The infrared-absorbing material may comprise a single metal, metal salt, metal oxide or metal nitride, or it may comprise a mixture of two or more of these substances.

The infrared-absorbing material may, for example, comprise a single metal element or a mixture of metallic elements (an alloy).

Alternatively and/or additionally the infrared-absorbing material may comprise an oxide, nitride or salt of a single metallic element, or an oxide, nitride or salt of two or more metallic elements. For example, it may comprise a mixed metal oxide; or it may comprise a mixture of two or more salts or oxides of different metals.

The one or more metallic species present in the infrared-absorbing material (which may be present as the pure metal or a salt, oxide or nitride thereof) may be selected to include any of the metallic elements.

Preferably the one or more metallic species is selected from the group consisting of group 13 (group IIIA), group 14 (group IVA), transition metals and rare earth metals.

More preferably the infrared-absorbing material comprises one or more metallic species selected from the group consisting of the metallic elements of period 4, the metallic elements of period 5 and the metallic elements of the lanthanide series.

Suitably the infrared-absorbing material comprises one or more metallic species selected from scandium, titanium, vanadium, chromium, manganese, iron, cobalt, nickel, copper, zinc, aluminium, gallium, yttrium, zirconium, niobium, molybdenum, technectium, ruthenium, rhodium, palladium, silver, cadmium, indium, tin, lanthanum, cerium, praseodymium, neodymium, promethium, samarium, dysprosium, holmium, thulium, erbium and ytterbium.

Preferably the infrared-absorbing material comprises one or more metallic elements selected from titanium, copper, zirconium, molybdenum, indium, tin, lanthanum, neodymium, praseodymium and dysprosium.

The infrared-absorbing material may comprise a metal salt. Suitable salts include fluorides, chlorides, bromides, iodides, nitrates, nitrites, sulfites, sulfates, phosphates, carbonates, borates, benzoates, acetates, chromates, hexaborides, molybdates, manganates, ferrates, organosulfates, organosulfonates, organophosphonates, organophosphates and phosphono-tungstanates.

Suitably the bonding between the metal species and the salt counterion is substantially ionic in character.

The infrared-absorbing material may comprise an oxide, or a mixed metal oxide or a mixture of metal oxides. The oxide(s) may be present in reduced or partially reduced form.

The bonding in suitable metal oxides and nitrides may be a hybridised form of bond that shows both covalent and ionic character.

Preferred infrared-absorbing materials for use in the composition of the present invention include reduced indium tin oxide, titanium nitride, zirconium nitride, molybdenum metal, copper chromate, lanthanum hexaboride, neodymium oxide, neodymium chloride, dysprosium oxide and praseodymium oxide.

The infrared-absorbing material is preferably a solid at room temperature and pressure. Preferably it comprises a powder.

The infrared-absorbing material may, for example, comprise nanoparticles. Nanoparticles are particles which have one or more dimensions of the order of 100 nm or less. Particle size may be measured by any suitable method. For example, any of the methods described in PAS 71:2005 published by British Standards could be used. Preferred methods for the determination of particle size include TEM (Transmission Electron Microscopy, when particles are made of a material that has high contrast with a carbon TEM grid), SEM (Scanning Electron Microscopy) and AFM (Atomic Force Microscopy). If the particles show plasmon resonance then the size can also be determined from the peak in the UV-VIS spectrum. For larger particles having a size of order of magnitude of $10^{-8}$ m or greater, light scattering can be used.

The Infrared-absorbing material may comprise a nanopowder. A nanopowder has an average particle size (equivalent spherical diameter) or less than 100 nm.

The infrared-absorbing material may comprise particles which are larger than nanoparticles. For example those having a particle size of 1 to 20 microns could be used.

In some embodiments, the infrared-absorbing material comprises, particles having a particle size (as defined above) of between 5 nm and 100 nm, for example between 10 nm and 80 nm, 15 nm and 50 nm, 20 nm and 40 nm, or 25 nm and 35 nm.

In other embodiments, the infrared-absorbing material comprises larger particles, for example those having a particle size of between 0.2 and 30 microns, for example between 0.4 and 20 microns, 0.6 and 10 microns or 0.8 and 5 microns.

The average particle size of the infrared material may simply be selected according to commercial availability, for cost reasons.

Preferably the infrared-absorbing material is present in the composition of the present invention in an amount of at least 0.1 wt % (percentage by weight of the infrared-absorbing compound compared to the total weight of the composition). Preferably it is present in an amount of at least 0.2 wt %, more preferably at least 0.3 wt %.

Preferably the infrared-absorbing material is present in the composition in an amount of up to 60 wt %, preferably up to 55 wt %, more preferably up to 50 wt %.

In some embodiments low concentrations of infrared-absorbing material are used. For example, the composition may comprise from 0.1 to 6 wt %, preferably 0.2 to 5 wt %, more preferably 0.3 to 3 wt % of the infrared-absorbing material.

In other embodiments, higher concentrations of the infrared-absorbing material may be included, for example 8-55 wt % of the infrared-absorbing material. For example the composition may comprise from 8 to 12 wt %, or 18 to 22 wt % or 45 to 55 wt % of the infrared-absorbing material.

In one preferred embodiment in which the infrared-absorbing material comprises reduced indium tin oxide, the average particle size of the infrared-absorbing material is suitably between 10 nm and 50 nm, preferably between 20 and 40 nm and most preferably between 25 and 35 nm.

Suitably, reduced indium tin oxide particles have an average particle size of approximately 30 nm.

Reduced indium tin oxide suitable for use in the present invention is available from Nano Products Corporation. It comprises a mixed metal oxide in which atoms of tin are substituted into the indium oxide crystal lattice. Preferably between 5 and 15%, suitably about 10% of the indium atoms are replaced by tin. The level of reduction in the reduced indium tin oxide is suitably from 0.1 to 5 mol %, preferably about 1 mol % (an oxygen atom is removed from about 1% of the indium tin oxide units).

When the infrared-absorbing material is reduced indium tin oxide, the composition preferably comprises from 0.1 to 5 wt % reduced indium tin oxide, more preferably 0.5 to 4 wt %, preferably 1 to 3 wt %, more preferably 1.5 to 2.5 wt %, most preferably 1.9 to 2.1 wt %.

In one preferred embodiment in which the infrared absorbing material comprises, neodymium oxide, the average particle size may be, for example, between 0.5 and 1.3 µm. Alternatively nanoparticles of neodymium oxide could be used having an average particle size of between 20 and 100 nm, for example 27 nm, 20 nm, 70 nm or 90 nm. Commercial sources of neodymium oxide suitable for use in the present invention include Nano Products Corporation (for nanoparticles) and Alfa Aesar (for standard material).

When the infrared-absorbing material is neodymium oxide; the composition preferably comprises at least 0.5 wt % neodymium oxide, preferably 1 wt %, more preferably at least 2 wt %, preferably at least 5 wt %, more preferably at least 8 wt %.

When the infrared-absorbing material is neodymium oxide, the composition preferably comprises up to 50 wt % neodymium oxide, more preferably up to 40 wt %, preferably up to 30 wt %, preferably up to 20 wt %, preferably up to 15 wt %, and more preferably up to 12 wtt.

Infrared radiation may be defined as electromagnetic radiation of wavelength from 750 nm to 1 mm. Preferably the infrared absorbing material absorbs light in the near infrared region (which may be defined as having a wavelength of 750 to 1400 nm).

The infrared-absorbing material preferably absorbs electromagnetic radiation having a wavelength which falls within the range 700 to 1500 nm, more preferably 750 to 1500 nm, for example 800 to 1400 nm.

The infrared-absorbing material may absorb electromagnetic radiation having a wavelength of between 800 and 900 nm. Alternatively it may absorb electromagnetic radiation at a wavelength which falls outside this range, for example it may absorb radiation at a wavelength of between 700 and 800 nm or between 800 and 900 nm. It may be that the infrared-absorbing material absorbs radiation at a wavelength between 800 and 900 nm and at a wavelength outside this range.

It may be that the infrared-absorbing material absorbs radiation over a narrow range of wavelengths within the infrared region of the electromagnetic spectrum.

Alternatively, the infrared-absorbing material may absorb radiation over a broad range of wavelengths within the infrared region of the electromagnetic spectrum.

Examples of infrared-absorbing materials which absorb radiation over a broad range of wavelengths include reduced indium tin oxide, titanium nitride, zirconium nitride, molybdenum, copper chromate and lanthanum hexaboride.

Examples of infrared-absorbing materials which absorb radiation over narrow ranges and thus have at least one sharp absorption peak include dysprosium oxide, neodymium oxide and neodymium chloride.

Materials which absorb over a narrow range may have an infrared spectrum which includes only a single sharp absorption peak or a spectrum having two or more absorption peaks.

Other materials, for example praseodymium oxide may have an infrared absorption spectrum which has some regions which absorb radiation over a broad range and some narrower absorption peaks.

In some embodiments the composition may include a first infrared-absorbing material which absorbs radiation over a narrow range of wavelengths and a second infrared-absorbing material which absorbs radiation over a broad range of wavelengths. The composition may include two or more infra-red absorbing materials which absorb radiation over a narrow wavelength band.

The infrared-absorbing material may be of any colour. However in preferred embodiments it is colourless, pale coloured or lightly coloured.

Preferably the infrared-absorbing material does not strongly affect the colour of the composition. This may be due to its concentration, its colour or lack thereof, and/or the presence of a strongly-coloured ink.

As noted above, the composition of the present invention comprises an ink. Preferably the composition comprises a base ink composition and an infrared-absorbing material. It may comprise only comprises a base ink composition and an infrared-absorbing material. Optionally it may comprise further components which provide additional security features.

The base ink composition may be suitable for any type of printing, for example offset printing (both lithographic and gravure), intaglio printing, letter-press printing, ink-jet printing and screen printing.

Preferably the base ink composition does not comprise any components which absorb infrared radiation to a substantial degree. Where the base ink composition does comprise components which absorb infrared radiation, preferably the absorption is much lower that the absorption of the infrared-absorbing material, especially in the range of 750 to 1400 nm. For example, the absorbance of the base ink composition is preferably less than 50% of the absorbance of the infrared-absorbing material, more preferably less than 30% thereof, of any wavelength of radiation within this range.

The present invention can be used with any commercially available or specially formulated base ink composition.

For inkjet printing, the base ink composition may be an aqueous composition. When the base ink composition is water based, the infrared-absorbing material is preferably substantially water soluble. An example of a water soluble infrared-absorbing material suitable for inclusion in a composition for inkjet printing is neodymium chloride.

However in some embodiments, it may be possible to use a fine dispersion of nanoparticles at low concentrations in an inkjet printer.

For other types of printing the base ink composition need not be aqueous. It may be an oleophilic composition and the infrared-absorbing material need not be water soluble.

For example, for intaglio printing, oil based inks are preferred.

The base ink composition may suitably comprise, for example, pigment and one or more components selected from varnish, calcium carbonate, linseed oil or an aliphatic mineral oil, polyethylene wax, hydroquinone and one or more driers. The quantities of each component present in the composition depends on the intended printing method. Suitable driers include manganese octoate and cobalt octoate. The varnish may for example comprise a phenolic resin, linseed oil and aromatic free mineral oil.

The composition of the first aspect of the present invention preferably comprises a base ink composition having dispersed therein particles of an infrared-absorbing material. Thus the composition may be considered to be a dispersion or suspension of the infrared-absorbing material in the base ink. The composition may comprise a base ink composition in which nanoparticles of the infrared-absorbing material are dispersed.

The base ink comprises a pigment. If the infrared-absorbing material is itself coloured, this pigment may help mask the colour (if any) of the infrared-absorbing materials, making its detection more difficult for counterfeiters.

According to a second aspect of the present invention there is provided an article comprising a substrate having imaged thereon an infrared-absorbing material to form a security image wherein said infrared-absorbing material comprises a metal, a metal salt, a metal oxide or a metal nitride.

Preferably the article is printed with a visible image. For example it may be a banknote. The visible image and the security image may be applied separately. Preferably they are co-applied.

The article is preferably a printed article in which an image has been printed onto the substrate using an ink composition, preferably an ink composition of the first aspect of the invention. Thus the image printed onto the substrate preferably contains a printed image and a security image which are coincident.

Preferably the substrate is a sheet substrate and more preferably a substantially planar sheet substrate. The sheet substrate may be rigid or flexible, but is preferably flexible. The article may comprise the infrared-absorbing material on one or both sides of such a substrate.

Suitable substrates include paper, especially paper used for bank notes such as velin paper, card, metals (including alloys), textiles (including wool, cotton, hemp, jute, linen and flax, as natural textiles, and nylon, rayon, polyamide and polyester as synthetic textiles), rubber, ceramics, glass, composite materials, carbon fibre, and any mixture thereof.

Preferred substrates are paper and card. Most preferably the substrate is paper, especially velin paper which is commonly used as a bank note substrate.

Preferably the infrared-absorbing material is present on the substrate in a concentration sufficient to absorb at least 10%, preferably at least 20%, more preferably at least 30% of at least one wavelength of infrared radiation incident thereon.

Preferably the article has an infrared absorbance of at least 30%, preferably at least 40%, more preferably at least 45% and most preferably at least 50%, of at least one wavelength of infrared radiation.

The article may absorb infrared radiation over a wide range, for example at least 100 nm, or at least 200 nm, within the range 750 to 1400 nm.

In some embodiments the article absorbs infrared radiation, preferably at an absorbance of at least 30%, substantially at all wavelengths in the range 600 to 1000 nm.

In other embodiments the article absorbs infrared radiation over one or more narrow ranges, for example a range of less than 100 nm, preferably at an absorbance of at least 20%, more preferably at least 30%.

In some preferred embodiments the article absorbs at least 30%, preferably at least 40%, more preferably at least 50% of radiation over two or more narrow ranges or bands within the range 600 to 1000 nm, for example within the ranges 700 to 800 nm and/or 600 to 700 nm and/or 800 nm to 900 nm and/or 900 to 1000 nm.

Preferably the infrared-absorbing material is present on the substrate at a concentration such that the colour of the article is not significantly affected by the presence of said material. Preferably the presence of the infrared-absorbing material on the substrate cannot be detected by visual inspection.

The article may comprise one or more additional security features. It may comprise further security images, and may include for example, further infrared-absorbing materials.

It may include an image formed from a traditional infrared-absorbing material, for example carbon black.

In preferred embodiments, the article of the second aspect comprises a substrate which has been printed with a composition of the first aspect and preferred features of the first aspect apply to the second aspect, where appropriate.

According to a third aspect of the invention there is provided a method of manufacture of an article comprising a security image, said method comprising applying image-wise to a substrate a composition comprising an infrared-absorbing material, wherein said infrared-absorbing material comprises a metal, a metal salt, a metal oxide or a metal nitride.

There may be more than one infrared-absorbing material of the type described, printed onto the substrate, and each infrared-absorbing material may be coated simultaneously or sequentially.

Suitably the composition containing the infrared-absorbing material is coated onto the substrate at a concentration of at least 1 $gm^{-2}$, preferably at least 2 $gm^{-2}$, more preferably at least 4 $gm^{-2}$, and most preferably at least 6 $gm^{-2}$.

Suitably the composition containing the infrared-absorbing material is coated onto the substrate at a wet film thickness of at least 1 µm, preferably at least 2 µm, more preferably at least 4 µm, most preferably at least 6 µm.

Films ranging from 2 µm to 80 µm wet film thickness are typically used in the bank note industry.

In one preferred embodiment in which the composition containing the infrared-absorbing material is coated onto the substrate by intaglio printing, the material is coated onto the substrate at a wet film thickness of at least 3 µm, preferably at least 5 µm. A suitable thickness is approximately 8 µm. However films of up to 80 µm thickness may be used.

Preferably in the method of manufacture of the third aspect, the substrate is coated with a composition of the first aspect. The composition is preferably as defined in relation to the first aspect and the substrate is preferably as defined in relation to the second aspect.

An article of the second aspect may suitably be manufactured by the method of the third aspect and thus features defined in relation to the third aspect apply to the second aspect and vice versa.

According to the fourth aspect of the present invention there is provided the use of an infrared-absorbing material comprising a metal, a metal salt, a metal oxide or a metal nitride as a security feature on an article.

Preferred features of the fourth aspect are as defined in relation to the first, second and third aspects.

According to a fifth aspect of the present invention there is provided a method of detecting a genuine article, the article being in accordance with the second aspect, said method comprising applying infrared radiation to the article and detecting absorption of said infrared radiation.

In the method of the fifth aspect, the infrared radiation may be applied and detected by any suitable means. Typically radiation is applied and the reflectance thereof is measured, thus allowing absorbance to be calculated. Preferably the method employs a reader device. The reader device may comprise an infrared emitter and an infrared detector.

Broadband infrared radiation may be applied using an InGas detector. Alternatively, radiation of a specific wavelength can be applied by an infrared laser device, for example a YAG laser which emits radiation at 1064 nm.

Infrared radiation can be emitted and reflectance detected, for example, by using a Shimadzu UV-3101 UV-VIS-NIR spectrophotometer incorporating a reflectance head.

The method may further comprise measuring the extent of the absorption of infrared radiation at a selected wavelength. Thus the percentage absorbance or reflectance can be measured.

The method may comprise detecting the absorption of infrared radiation at more than one selected wavelength, for example at two or more selected wavelengths. The method may comprise measuring the extent of the absorption at more than one selected wavelength. It may further comprise measuring the ratio of absorbance or reflectance at two or more selected wavelengths.

The method may comprise measuring the absorption of infrared radiation over a range of wavelengths. It may further comprise measuring the extent of absorption over a range of wavelengths.

The method may comprise measuring and recording the infrared spectrum over a wavelength range for example over the range 750 to 1400 nm.

Thus the method of the present invention may in some embodiments permit a quick, non-quantitative determination of the presence or otherwise of an infrared-absorbing material, by quickly checking for broadband adsorption or absorption at specific wavelength.

Alternatively, the method may be used to measure quantitatively the extent of absorbance at a specific wavelength or across a broad range of wavelengths. The more accurately the infrared absorption spectrum of an article is measured, the more difficult it would be to counterfeit such an article.

The invention provides a particularly accurate method of detecting a genuine article for some embodiments in which the article is imaged with a composition comprising two or more infrared-absorbing materials, the materials being present in a specific ratio to each other, or in which an article is imaged with two or more compositions each containing a specific ratio of one or more infra-red absorbing materials. The resultant image can then be detected using a machine reader and the absorption intensity of the peaks compared to ensure the image contains the appropriate infrared-absorbing materials in the correct ratio. By varying the concentrations of the individual infrared-absorbing materials present in the ink, a whole series of algorithms would be generated which would enable generation of a series of individual codes for numerous applications. Suitably the system could include three infrared-absorbing materials, preferably having narrow absorption bands. This would enable individual infrared absorption peaks to be easily identified and measured. However an infrared-absorbing material absorbing over a broad absorption range could be used as long as it was not so strong as to mask other compounds present.

The reader device could be built into a machine, for example a passport scanner, a chip-and-pin device, or an ATM. Alternatively a reader device could be supplied independently as a mobile device.

The method of the fifth aspect may be carried out periodically on randomly selected articles or it may be carried out routinely on every article. For example, a photosensitive diode could be included in a cash machine to measure the IR absorbance at a given wavelength of each banknote. Thus, a counterfeit banknote could be easily detected.

BRIEF DESCRIPTION OF THE DRAWINGS

The invention is further described with reference to the accompanying drawings, in which.

EXAMPLES

The invention will now be further defined by way of the following non-limiting examples.

Unless otherwise stated, all percentages of components are percentages by weight of the relevant composition.

Example 1

An offset security ink was prepared by dispersing an infrared-absorbing pigment in a commercially available offset ink formulation. Thus, nanoparticle reduced indium tin oxide (Nano Products Corporation, 30 nm average particle size, determined by surface area analysis using the Brunauer, Emmett and Teller method, and crystallite size measurements by X-ray diffraction), (0.5 g) was dispersed in a IR invisible transparent white offset ink base (24.5 g) (Gleitsmann Security Inks GmbH) on a triple roll mill; the offset ink base being formulated as follows in Table 1:

TABLE 1

| Offset ink base formulation | |
|---|---|
| Component | Weight (%) |
| Varnish* | 67.0 |
| Pigment (white) | 4.5 |
| Calcium carbonate | 9.2 |
| Linseed oil | 13.7 |
| Polyethylene wax | 5.0 |
| Hydroquinone | 0.3 |
| Drier (10% manganese octoate) | 0.2 |
| Drier (18% cobalt octoate) | 0.1 |

The varnish was composed of a modified phenolic resin (40%), linseed oil (20%), aromatic free mineral oil (boiling range 280-310° C.) (20%), aromatic free mineral oil (boiling range 260-290° C.) (19.3%) and aluminium (ethylacetoacetonato) isopropoxide (0.7%). Rosin modified phenolic resin is used as this offers high viscosity, high solubility and low tack to provide optimum rheological properties. The pigment was believed to be titanium dioxide.

Proof prints of the offset infrared-absorbing security ink were prepared on velin paper using a Prüfbau proof printer; the inks being printed at a film thickness of 12.0 gm$^{-2}$ to yield a pale grey image. The IR absorbance of the resulting print was measured on a Shimadzu UV-3101 UV-VIS-NIR spectrophotometer incorporating a reflectance head attachment; the print exhibiting an IR absorbance of 51.0% at a wavelength of 815 nm. The prints exhibited excellent chemical resistance properties when exposed to chemical media such as xylene, hydrochloric acid, sodium hydroxide or tetrachloroethylene.

Figure 1:
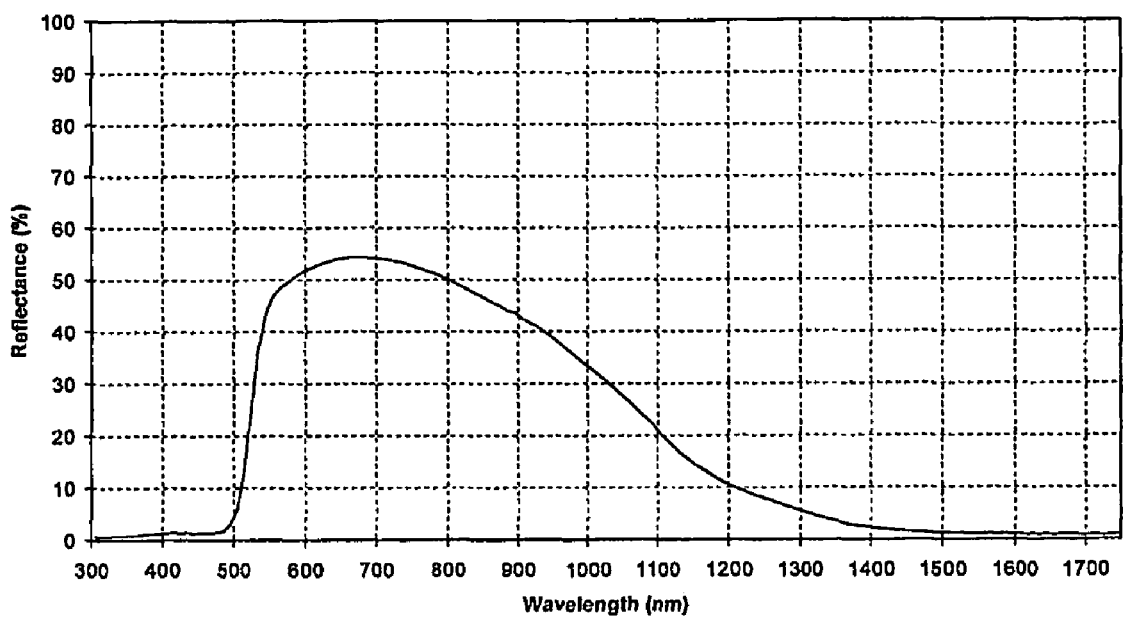
FIGS. 1-10 are reflectance spectra of prints described in the Examples.

The complete reflectance spectrum is shown below in FIG. 1. It can be seen that the IR absorbance is significantly stronger at wavelengths greater than 1000 nm. This means that at lower concentrations of reduced indium tin oxide (nanoparticle) sensitivity of detection is best at these higher wavelengths; this is important if thinner films are printed.

Example 2

The process described in Example 1 was repeated, but in this case an ink containing a reduced indium tin oxide (nanoparticle, as Example 1) concentration of 30% (7.5 g in 17.5 g of transparent white ink base) was formulated and used to prepare proof prints on Velin paper at a film thickness of 2.0 gm$^{-2}$; the printed images being almost colourless. The printed images exhibited an IR absorbance of 51.0% at a wavelength of 1065 nm.

Example 3

The process described in Example 1 was repeated, but in this case an orange base ink containing a reduced indium tin oxide (nanoparticle, as Example 1) concentration of 20% (5 g in 20 g of orange IR transparent ink base) was formulated and used to prepare proof prints on Velin paper at a film thickness of 2.0 gm$^{-2}$; the printed images being matched to similar prints that had been prepared with inks formulated from the orange ink base in the absence of the IR absorber. The printed orange images exhibited an IR absorbance of 51.0% at a wavelength of 1210 nm.

Example 4

Figure 2:
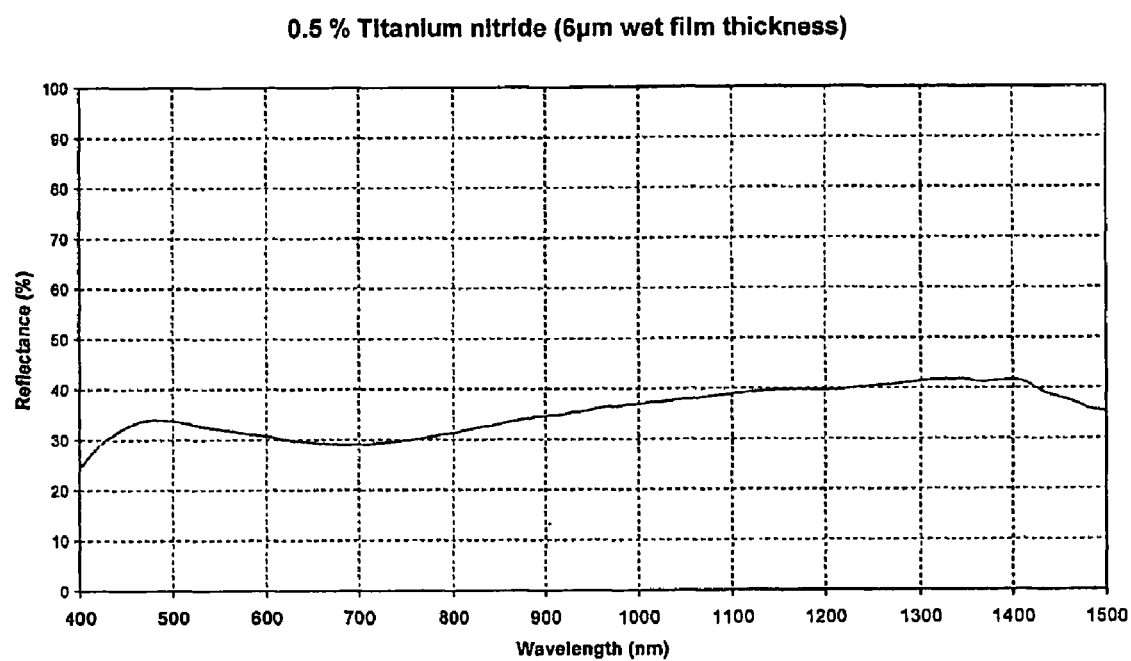

The process described in Example 1 was repeated, but in this case nano particle titanium nitride (Neomat Co, average particle size of 269 nm) was used as the IR absorber in place of reduced indium tin oxide. Thus, an ink containing a titanium nitride (nanoparticle) concentration of 0.25% (0.0625 g in 24.9375 g of transparent white ink base) was formulated and used to prepare proof prints on Velin paper at a film thickness of 6.0 gm$^{-2}$; the printed images being pale grey in colour. The printed images exhibited an IR absorbance of 56.7% at a wavelength of 805 nm. The reflectance spectrum of the print is shown below in FIG. 2.

Example 5

Figure 3:
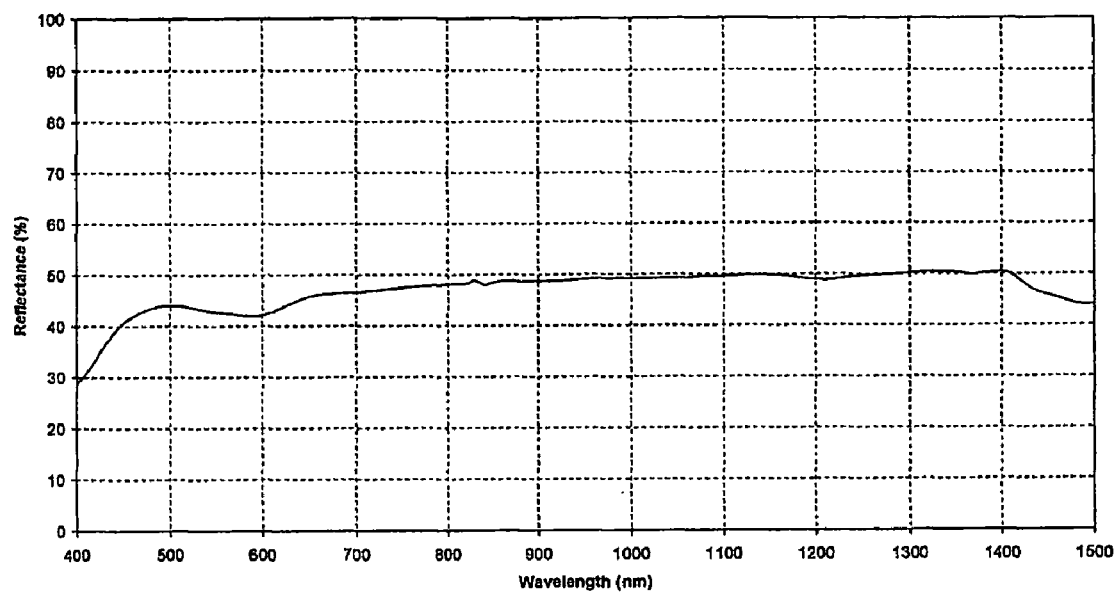

The process described in Example 1 was repeated, but in this case zirconium nitride (1-2 micron particle size, Aldrich) was used as the IR absorber in place of reduced indium tin oxide. Thus, an ink containing a zirconium nitride (1-2 micron) concentration of 0.5% (0.125 g in 24.875 g of transparent white ink base) was formulated and used to prepare proof prints on Velin paper at a film thickness of 6.0 gm$^{-2}$; the printed images being pale grey in colour. The printed images exhibited an IR absorbance of 52.7% at a wavelength of 805 nm. The reflectance spectrum of the print is shown below in FIG. 3.

Example 6

Figure 4:
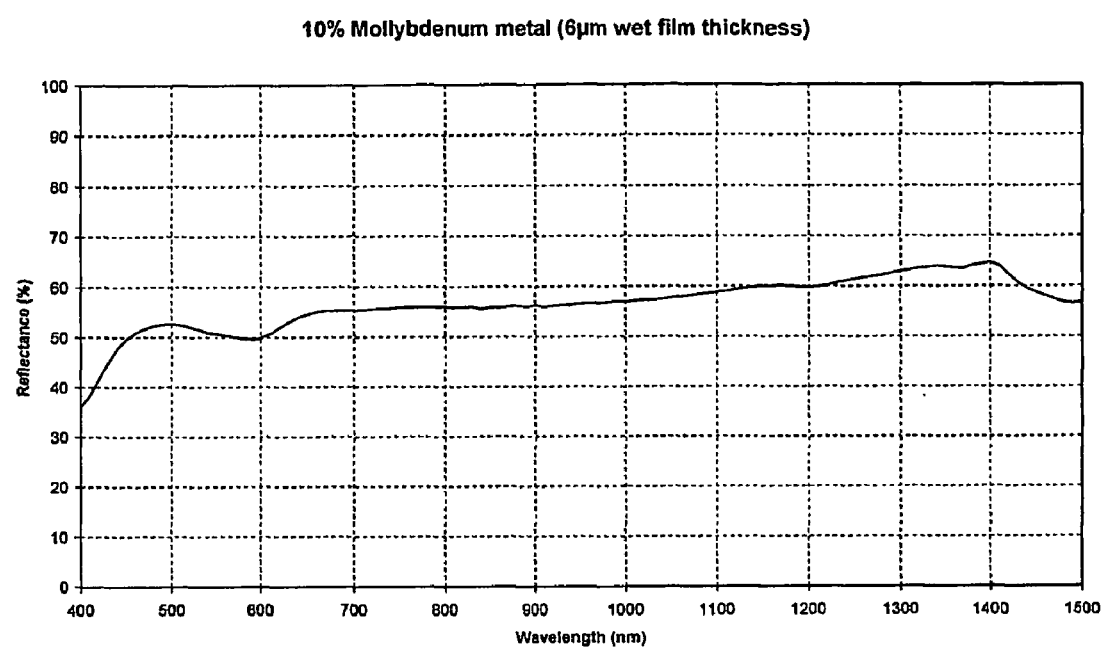

The process described in Example 1 was repeated, but in this case molybdenum metal powder (Fluka, average particle size of 855 nm) was used as the IR absorber in place of reduced indium tin oxide. Thus, an ink containing a molybdenum metal powder concentration of 10% (2.5 g in 22.5 g of transparent white ink base) was formulated and used to prepare proof prints on Velin paper at a film thickness of 6.0 gm$^{-2}$; the printed images being pale grey in colour. The printed images exhibited an IR absorbance of 44.7% at a wavelength of 805 nm. The reflectance spectrum of the print is shown in FIG. 4.

Example 7

Figure 5:
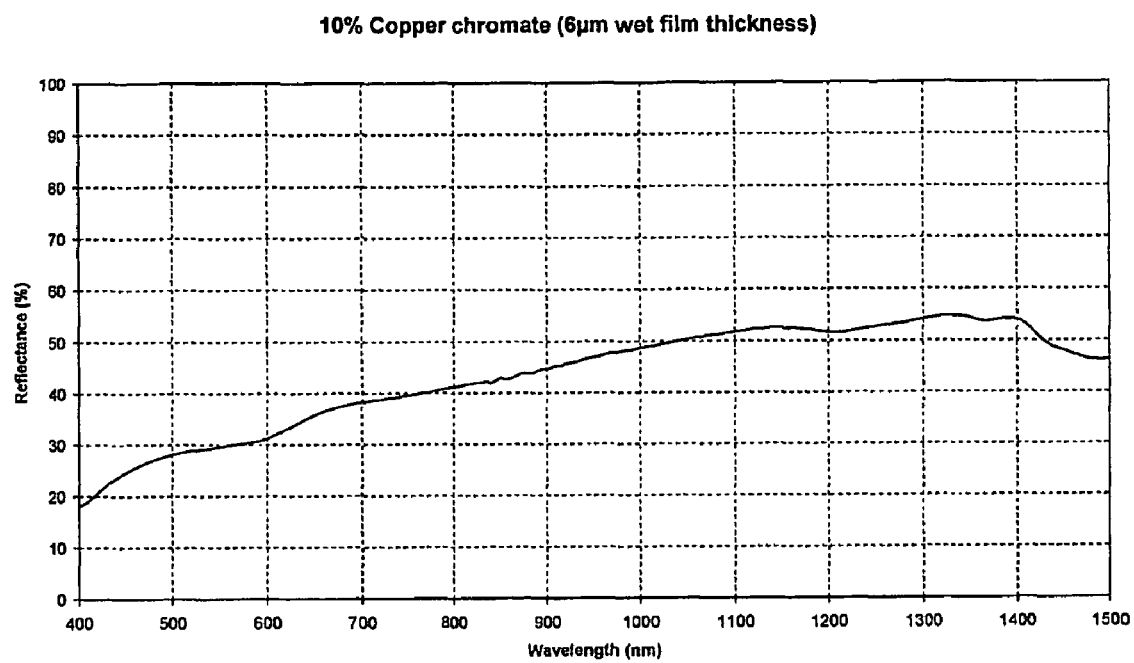

The process described in Example 1 was repeated, but in this case copper chromate (Aldrich, average particle size of 335 nm) was used as the IR absorber in place of reduced indium tin oxide. Thus, an ink containing a copper chromate concentration of 10% (2.5 g in 22.5 g of transparent white ink base) was formulated and used to prepare proof prints on Velin paper at a film thickness of 6.0 gm$^{-2}$; the printed images being pale grey in colour. The printed images exhibited an IR absorbance of 58.9% at a wavelength of 805 nm. The reflectance spectrum of the print is shown in FIG. 5.

Example 8

Figure 6:
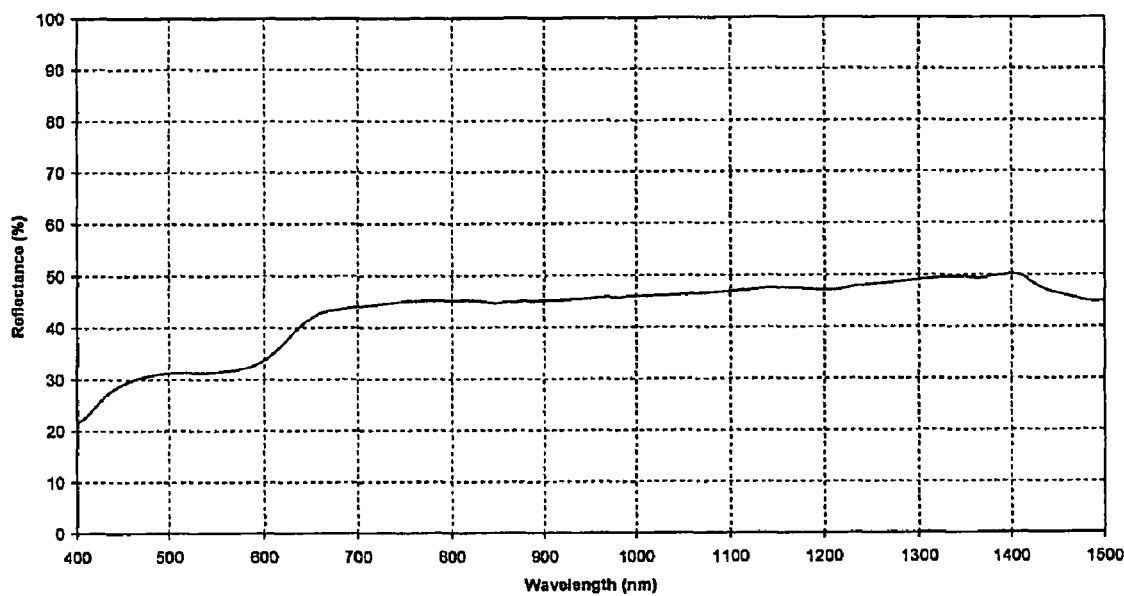

The process described in Example 1 was repeated, but in this case lanthanum hexaboride (10 micron particle size) (Aldrich) was used as the IR absorber in place of reduced indium tin oxide. Thus, an ink containing a lanthanum hexaboride (10 micron) concentration of 5% (1.25 g in 23.75 g of transparent white ink base) was formulated and used to prepare proof prints on Velin paper at a film thickness of 6.0 gm$^{-2}$; the printed images being light grey in colour. The printed images exhibited an IR absorbance of 55.4% at a wavelength of 805 nm. The reflectance spectrum of the print is shown in FIG. 6.

Example 9

An intaglio security ink was prepared by dispersing an infrared-absorbing pigment in a commercially available intaglio ink formulation. Thus, reduced indium tin oxide (nanoparticle, as Example 1), (0.5 g) was dispersed in an IR-invisible transparent white intaglio ink base (24.5 g) (Gleitsmann Security Inks GmbH) on a triple roll mill; the intaglio ink base being formulated as follows in Table 2:

TABLE 2

| Intaglio ink base formulation | |
|---|---|
| Component | Weight (%) |
| Modified vehicle* | 38.0 |
| Pigment (white) | 2.0 |
| Calcium carbonate | 49.6 |
| Polyethylene wax (micronised) | 8.0 |
| Drier (10% manganese octoate) | 0.3 |
| Drier (18% cobalt octoate) | 0.1 |
| Aliphatic mineral oil (boiling range 170-260° C.) | 2.0 |

The modified vehicle was composed of a commercial vehicle/varnish (80%), Trionol HK 9 (Lawter International, Belgium) and bodied tung oil (20%). The pigment was believed to be titanium oxide.

Proof prints of the intaglio infrared-absorbing security ink were prepared on Velin paper using a Prüfbau proof printer; the inks being printed at a film thickness of 80.0 gm$^{-2}$ to yield a light grey image. The IR absorbance of the resulting print was measured on a Shimadzu UV-3101 UV-VIS-NIR spectrophotometer incorporating a reflectance head attachment; the print exhibiting an IR absorbance of 67.2% at a wavelength of 810 nm. The prints exhibited excellent chemical resistance properties when exposed to chemical media such as xylene, hydrochloric acid, sodium hydroxide or tetrachloroethylene.

Example 10

A letter-press security ink was prepared by dispersing an infrared-absorbing pigment in a commercially available letter-press ink formulation. Thus, reduced indium tin oxide (nanoparticle, as Example 1), (0.5 g) was dispersed in a IR invisible transparent white letter-press ink base (24.5 g) (Gleitsmann Security Inks GmbH) on a triple roll mill; the letter-press ink base being formulated as follows in Table 3:

TABLE 3

| Letter-press ink base formulation | |
|---|---|
| Component | Weight (%) |
| Varnish* | 63.5 |
| Pigment (white) | 4.5 |
| Calcium carbonate | 22.3 |

TABLE 3-continued

Letter-press ink base formulation

| Component | Weight (%) |
| --- | --- |
| Linseed oil | 5.1 |
| Aliphatic mineral oil (boiling range 260-310° C.) | 4.0 |
| Hydroquinone | 0.3 |
| Drier (10% manganese octoate) | 0.2 |
| Drier (18% cobalt octoate) | 0.1 |

The varnish was composed of a rosin modified phenolic resin (40%), linseed oil (20%), aromatic free mineral oil (boiling range 280-310° C.) (20%), aromatic free mineral oil (boiling range 260-290° C.) (19.3%) and aluminium (ethylacetoacetonato) isopropoxide (0.7%). The pigment was believed to be titanium oxide.

Proof prints of the letter-press infrared-absorbing security ink were prepared on Velin paper using a Prüfbau proof printer; the inks being printed at a film thickness of 4.0 $gm^{-2}$ to yield a very pale grey image. The IR absorbance of the resulting print was measured on a Shimadzu UV-3101 UV-VIS-NIR spectrophotometer incorporating a reflectance head attachment; the print exhibiting an IR absorbance of 51.0% at a wavelength of 850 nm. The prints exhibited excellent chemical resistance properties when exposed to chemical media such as xylene, hydrochloric acid, sodium hydroxide or tetrachloroethylene.

Example 11

Figure 7:
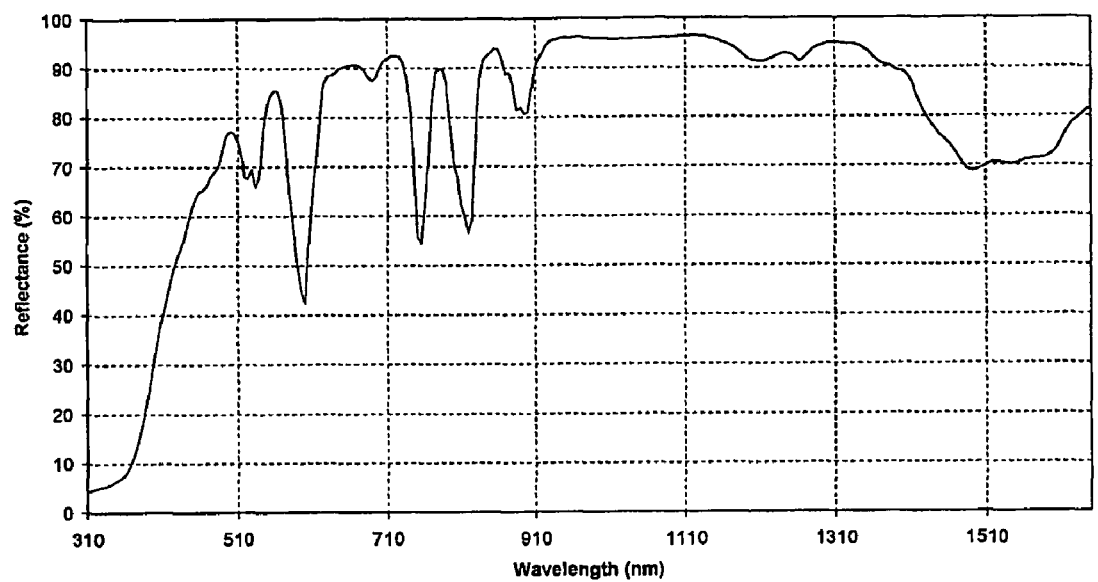

The process described in Example 1 was repeated, but in this case neodymium oxide (27 nm average particle size, Aldrich) was used as the IR absorber in place of reduced indium tin oxide. Thus, an ink containing a neodymium oxide (nanoparticle) concentration of 20% (5.0 g in 20.0 g of transparent white ink base) was formulated and used to prepare proof prints on Velin paper at a film thickness of 6.0 $gm^{-2}$; the printed images being pale blue in colour. The printed images exhibited a series of IR absorbance peaks that exhibited the following absorbance intensities: 34.2% at a wavelength of 535 nm, 57.7% at a wavelength of 600 nm, 45.5% at a wavelength of 755 nm, 43.6% at a wavelength of 820 nm and 19.0% at a wavelength of 900 nm. The reflectance spectrum of the print is shown in FIG. 7.

Example 12

Figure 8:
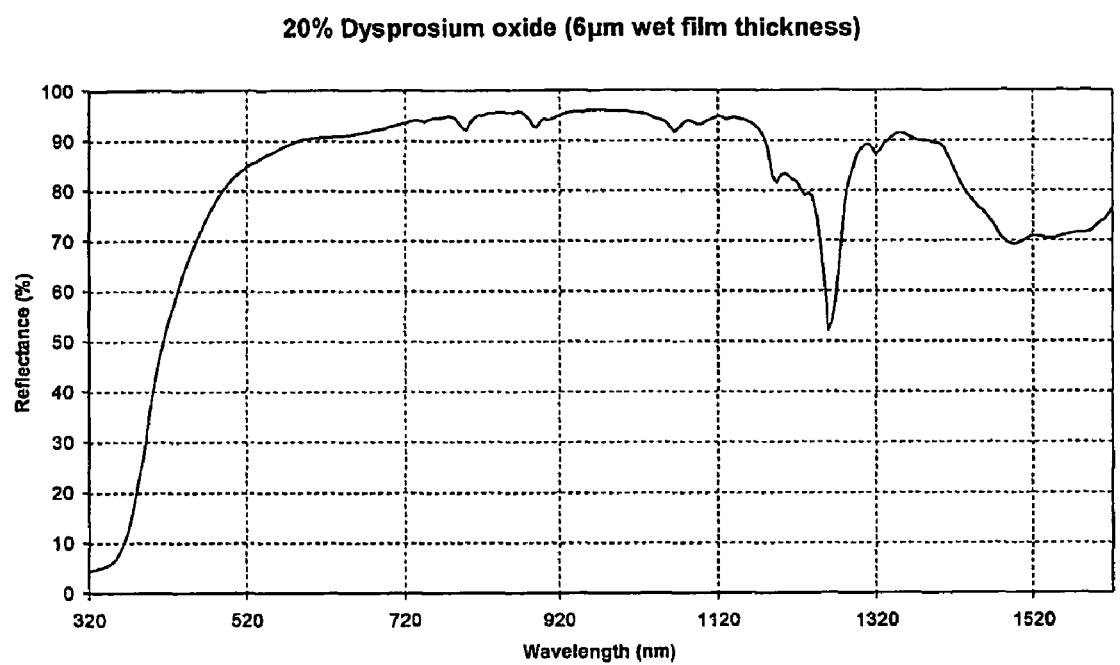

The process described in Example 1 was repeated, but in this case dysprosium oxide (Aldrich, average particle size of 759 nm) was used as the IR absorber in place of reduced indium tin oxide. Thus, an ink containing a dysprosium oxide concentration of 20% (5.0 g in 20.0 g of transparent white ink base) was formulated and used to prepare proof prints on Velin paper at a film thickness of 6.0 $gm^{-2}$; the printed images being colourless in appearance. The printed images exhibited an IR absorbance of 47.9% at a wavelength of 1260 nm. The reflectance spectrum of the print is shown in FIG. 8.

Example 13

Figure 9:
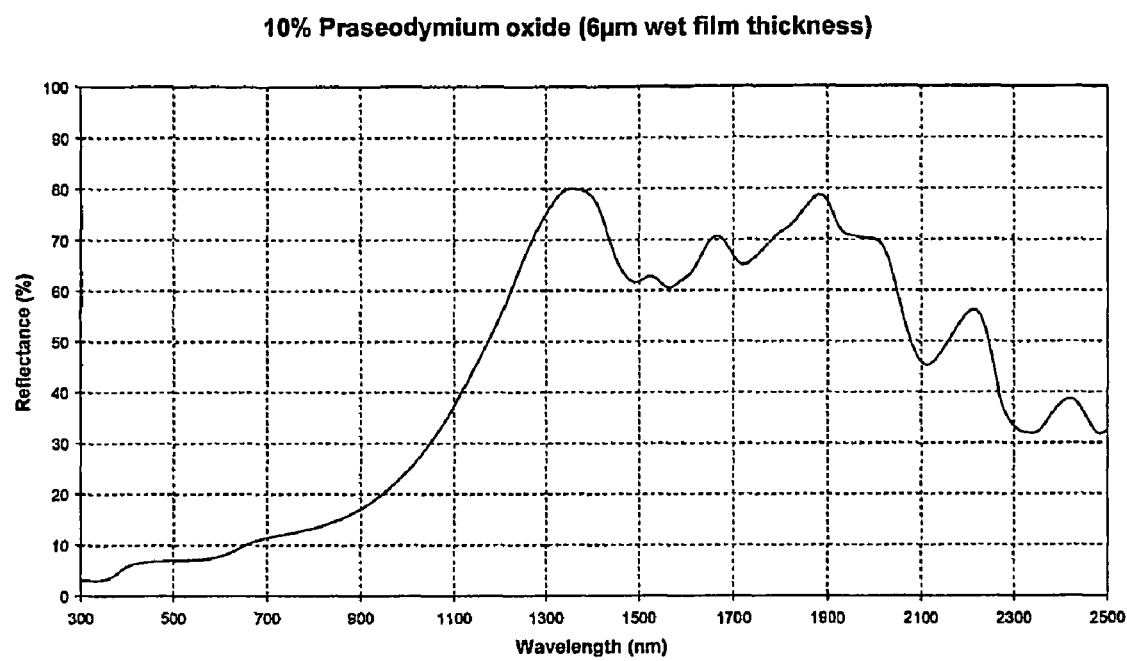

The process described in Example 1 was repeated, but in this case praseodymium oxide (Aldrich, average particle size of 637 nm) was used as the IR absorber in place of reduced indium tin oxide. Thus, an ink containing a praseodymium oxide concentration of 10% (2.5 g in 22.5 g of transparent white ink base) was formulated and used to prepare proof prints on Velin paper at a film thickness of 6.0 $gm^{-2}$; the printed images being black in colour. The printed images exhibited an IR absorbance of 13.2% at a wavelength of 800 nm. The reflectance spectrum of the print is shown in FIG. 9.

Example 14

Figure 10:
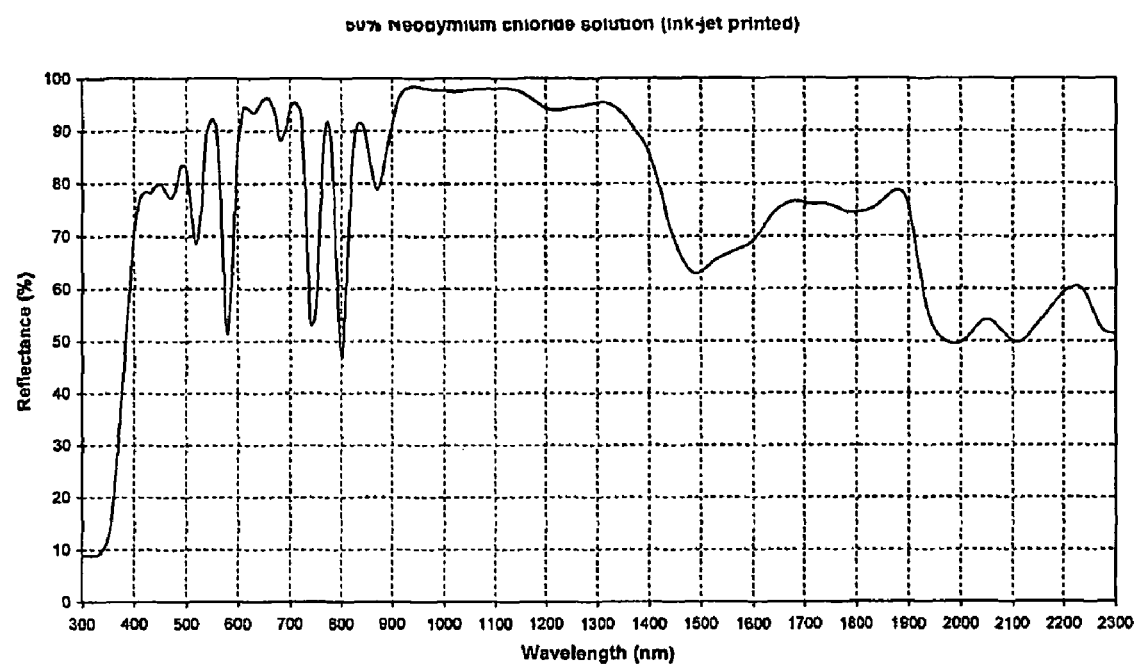

Velin paper substrates were ink-jet printed with an IR absorbing ink on an Apollo P-1200 ink-jet printer to yield a colourless printed image that could be detected using a Shimadzu UV-3101 VIS-NIR spectrophotometer incorporating a reflectance head attachment; the ink being formulated in accordance with the following recipe:

500 $gdm^{-3}$ Neodymium III chloride hexahydrate (Aldrich, UK)
5 $gdm^{-3}$ Polypropylene glycol 425 (Aldrich, UK)
0.5 $gdm^{-3}$ Cibafast W (Ciba)
pH 6.0
De-ionised water to 1 litre The colourless printed image provides a covert security image that yielded the reflectance spectrum shown in FIG. 10, when detected using the Shimadzu UV-3101 VIS-NIR spectrophotometer. The spectrum obtained yielded a series of characteristic peaks that exhibited the following absorbance intensities: 22.7 at a wavelength of 470 nm, 31.5 at a wavelength of 520 nm, 48.6 at a wavelength of 580 nm, 7.0 at a wavelength of 630 nm, 21.8 at a wavelength of 680 nm, 46.7 at a wavelength of 740 nm, 53.0 at a wavelength of 800 nm and 21.0 at a wavelength of 870 nm.

Example 15

In intaglio security ink was prepared by dispersing an infrared-absorbing pigment in a commercially available intaglio ink formulation. Various concentrations of neodymium oxide (standard powder of average particle size 1.3 micron from Alfa Aesar) were dispersed in an infrared-invisible transparent white intaglio base ink (Gleitsmann Security Inks GmbH) on a triple roll mill. The base ink was formulated as in Table 2—as Example 9.

Proof prints of the intaglio infrared-absorbing security ink were prepared on Velin paper using a Prüfbau proof printer. Table 4 shows the absorbance measured at 760 nm, 820 nm and 900 nm for different concentrations and various film thicknesses. IR absorbance measurements were taken on a Shimadzu UV-3101 VIS-NIR spectrophotometer.

TABLE 4

| Concentration in ink (%) | Wet film thickness (μm) | Absorbance (%) | | |
| --- | --- | --- | --- | --- |
| | | 760 nm | 820 nm | 900 nm |
| 10.0 | 4 | 48.7 | 54.1 | 46.7 |
| 15.0 | 4 | 62.4 | 67.9 | 59.3 |
| 20.0 | 4 | 70.3 | 75.4 | 70.3 |
| 10.0 | 6 | 41.0 | 46.9 | 18.7 |
| 2.5 | 8 | 47.5 | 50.1 | 44.8 |
| 5.0 | 8 | 49.5 | 53.6 | 43.5 |
| 7.5 | 8 | 51.8 | 56.5 | 42.8 |
| 10.0 | 8 | 59.3 | 63.7 | 48.2 |
| 15.0 | 8 | 63.2 | 68.7 | 61.2 |
| 20.0 | 8 | 70.8 | 75.1 | 71.3 |

The invention claimed is:

1. A composition comprising an oleophilic base ink composition having dispersed therein particles of an infrared-absorbing material wherein said infrared-absorbing material is selected from reduced indium tin oxide, titanium nitride, zirconium nitride, molybdenum metal, copper chromate, lanthanum hexaboride, neodymium oxide, neodymium chloride, dysprosium oxide and praseodymium oxide.

2. A composition according to claim 1 wherein the particles of the infrared-absorbing material have an average particle size of between 0.2 and 30 microns.

3. A composition according to claim 2 wherein the particles of the infrared-absorbing material comprise nanoparticles.

4. A composition according to claim 3 wherein the infrared-absorbing material absorbs radiation over a narrow range of wavelengths within the infrared region of the electromagnetic spectrum and is selected from dysprosium oxide, neodymium oxide and neodymium chloride.

5. A composition according to claim 4 wherein the infrared-absorbing material is dysprosium oxide.

6. A composition according to claim 1 wherein the infrared-absorbing material absorbs radiation over a broad range of wavelengths within the infrared region of the electromagnetic spectrum and is selected from reduced indium tin oxide, titanium nitride, zirconium nitride, molybdenum, copper chromate and lanthanum hexaboride.

7. A composition according to claim 1 wherein the infrared absorbance of the base ink is less than 50% of the absorbance of the infrared-absorbing wavelength, of any wavelength within this range.

8. A composition according to claim 1 wherein the infrared absorbing material is colourless, pale coloured or lightly coloured.

\* \* \* \* \*